No. 842,247. PATENTED JAN. 29, 1907.
F. H. RICHARDS.
PANTOGRAPHIC MILLING MACHINE.
APPLICATION FILED DEC. 20, 1900.

Witnesses:-
F. C. Fliedner
F. N. Haviland

Inventor;
F. H. Richards.

No. 842,247.

PATENTED JAN. 29, 1907.

F. H. RICHARDS.
PANTOGRAPHIC MILLING MACHINE.
APPLICATION FILED DEC. 20, 1900.

Witnesses:—
J. E. Fliedner
F. N. Haviland

Inventor;
F. H. Richards.

No. 842,247. PATENTED JAN. 29, 1907.
F. H. RICHARDS.
PANTOGRAPHIC MILLING MACHINE.
APPLICATION FILED DEC. 20, 1900.

Witnesses:
F. C. Fliedner.
F. N. Wanland.

Inventor,
F. H. Richards.

No. 842,247. PATENTED JAN. 29, 1907.
F. H. RICHARDS.
PANTOGRAPHIC MILLING MACHINE.
APPLICATION FILED DEC. 20, 1900.

Witnesses:—
F. C. Fliedner.
F. W. Haviland.

Inventor,
F. H. Richards.

No. 842,247. PATENTED JAN. 29, 1907.
F. H. RICHARDS.
PANTOGRAPHIC MILLING MACHINE.
APPLICATION FILED DEC. 20, 1900.

Witnesses:
J. C. Fliedner.
F. W. Hanland.

Inventor,
F. H. Richards.

UNITED STATES PATENT OFFICE.

FRANCIS H. RICHARDS, OF HARTFORD, CONNECTICUT, ASSIGNOR, BY MESNE ASSIGNMENTS, OF ONE-HALF TO AMERICAN TYPOGRAPHIC CORPORATION, A CORPORATION OF NEW JERSEY.

PANTOGRAPHIC MILLING-MACHINE.

No. 842,247.  Specification of Letters Patent.  Patented Jan. 29, 1907.

Application filed December 20, 1900. Serial No. 40,571.

*To all whom it may concern:*

Be it known that I, FRANCIS H. RICHARDS, a citizen of the United States, residing at Hartford, in the county of Hartford and State of Connecticut, have invented certain new and useful Improvements in Pantographic Milling-Machines, of which the following is a specification.

This invention relates to improvements in pantographic milling-machines, and more particularly to those for the purpose of milling out raised or intaglio objects in metal and other materials.

In the accompanying drawings.

Similar characters designate like parts in the different figures of the drawings.

In the embodiment of my invention shown herewith the numeral 10 designates in a general way some suitable base or near one end of which is a pair of lugs 11. These lugs are provided with openings in which are pivot-pins 12, having inclined or conical points, with these points in horizontal alinement. The pins may be retained in the openings by slitting the lugs, as shown at 13, and drawing the parts together by screws 14. Mounted upon the pins 12 as an axis, with depressions corresponding in form engaging their pointed ends, is an oscillatory frame, (designated as a whole by F.) This is of a form suitable to support the elements hereinafter described and may be constructed of tubular members 15 15', united by collars 16, to which they are brazed or otherwise secured. Upon the upper side of four of the frame members those designated as 15' may be formed raised ways 17, the surfaces of which lie in a common plane. On these ways slide four members 18 18' 19 19' of a pantograph system, (designated as a whole by P,) each member being preferably provided with a raised surface 20 for contact with one of the ways 17.

The members 18 18' are pivoted together at one end, one of these, as 18', being provided with bifurcated arms 21 21, which may be slit longitudinally in a vertical plane at 22 and have openings in vertical alinement, in which fit pivot-pins 23, provided with inclined surfaces or points at each end and which are clamped in place by screws 24, serving to draw the slit portion of the arms together. The corresponding end of the other member, as 18, is shown as of a suitable width to enter between the arms 21 of the former, having an opening 25, and in the solid portion 26 outside of the opening are provided depressions 27, so formed and located as to engage the inner ends of the pivot-pins 23. The outer ends of said pins are in turn received by depressions 28 in arms 29 of a bracket 30, which, since it rocks with the pantograph system when the latter is rocked transversely to its plane, may, as in this instance, be secured to the frame F near one of its pivots. The depressions 28 are shown as formed in upper and lower cups 31 32, respectively, the latter situated in a recess in the lower arm and the upper adjustably held in the opening in the upper arm, which is slit at 33 and the parts drawn together and the cup clamped in place by screws 34.

Figure 12:
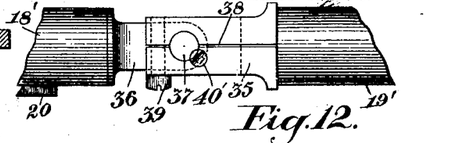
Figs. 12, 13, and 14 are respectively a plan, a side elevation, and a vertical section of another joint between the pantograph members.
Figure 13:
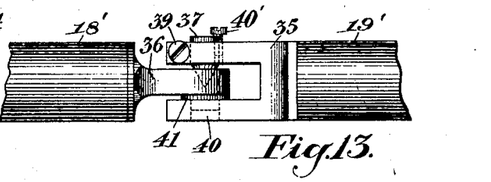
Figure 14:
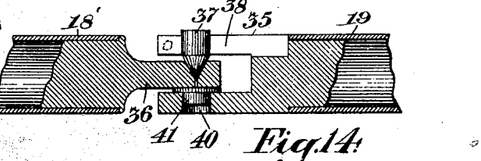
Figures 15, 16:
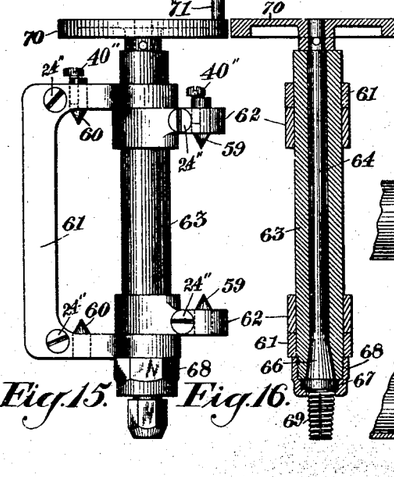
Figs. 15 and 16 are respectively a side elevation and a central vertical transverse section of the mechanism for actuating the tool.
Figure 17:
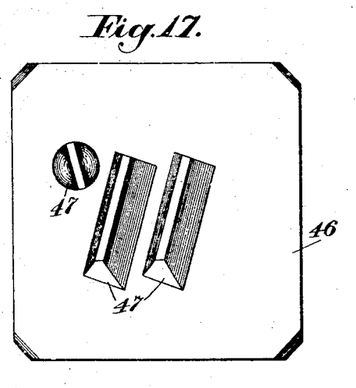
Fig. 17 is a top plan view of a support for a pattern.
Figure 18:
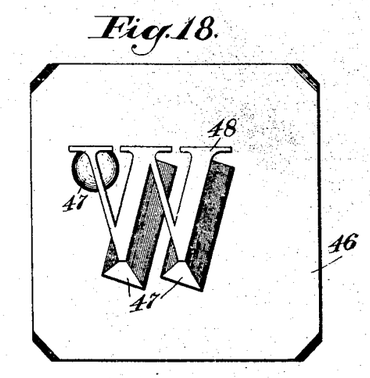
Fig. 18 is a similar view with the pattern in place.
Figure 19:
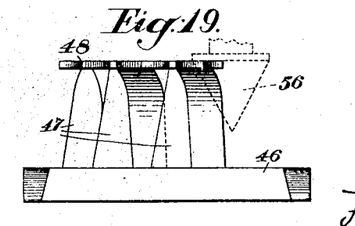
Fig. 19 is a side elevation of Fig. 18 looking from the lower toward the upper side with reference to the plan view thereof and showing in addition the tracer in contact with the pattern.
Figures 20, 22:
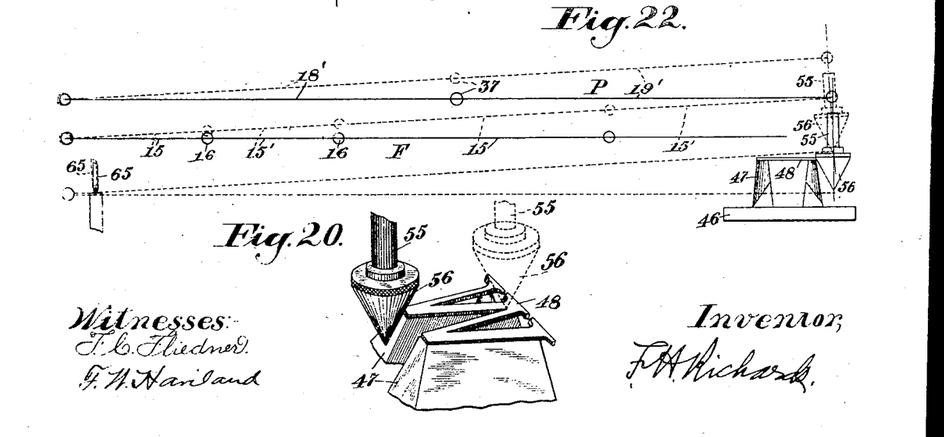
Fig. 20 is a partial perspective view of the same with the tracer in two positions.
Fig. 22 is a diagrammatic side elevation showing the tool in two positions.
Figure 21:
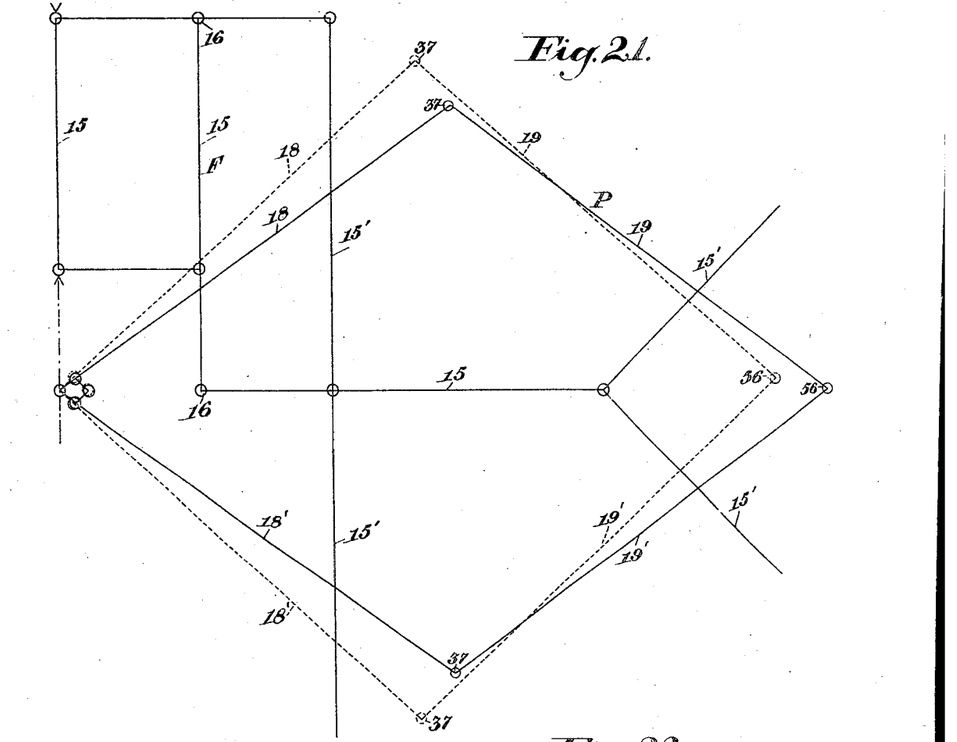
Fig. 21 is a diagrammatic plan view of the mechanism, illustrating the movement of the pantograph members.

The adjacent ends of the pairs of members 18 18' and 19 19' are pivotally jointed together, a convenient way of forming this joint being here shown. In Figs. 12, 13, and 14 the members 18' and 19' are shown; but the members 18 and 19 are also shown as similarly constructed in the other views. Each member 19 19' has a bifurcated end, between the arms 35 of which projects a reduced end piece 36, carried by the member 18 18'. One of the arms is provided with an opening, preferably cylindrical, to receive a pivot-pin 37, having a similarly-formed portion and an inclined or conical inner end, which engages the corresponding opening or depression in one face of the piece 36. The pin 37 may be retained in place by a slit 38 and binding-screw 39, such as has been previously described. A screw 40' may be threaded into the arm adjacent to the pivot-pin, with the under side of its head extending above the same, and may serve by its pressure thereon to adjust the pin to a bearing in its depression. The opposite arm 35 has a cylindrical opening 40, in which fits to turn or rotate freely a cylindrical piece 41, having at its inner end a disk or plate with a plane inner face, against which rests a corresponding surface upon the face of the piece 36 opposite the pin. With this arrangement it will be seen that all difficulty in securing true alinement, which might occur if there were two oppositely-placed pivot-pins, is obviated, the single pin securing the members together, while the plane faces on the end piece and plate may shift over one another as the pin is brought down to its bearing. At the same time the capability for rotation of the plate permits the free operation of the joint. By mounting these pivot-pins and others in the machine in smooth parallely-situated openings rather than by threading the contacting surfaces they may be moved in and out without rotating, and thus causing a liability to shift the axis. The adjacent ends of the members 19 19 may be connected together through the arms 35' and intermediate end piece 36' by a similar joint to that just described.

To maintain the members 18 18' 19 19' of the pantograph system in association with the supporting-frame when the system is turned about the axis of oscillation of the frame, there are provided retaining-bars 42 42, secured to the portion of the frame upon which the members 19 19' rest and located above them, the under sides of the retaining-bars contacting with plane surfaces 43 upon said members.

The frame F may be supported in its lowest position by a loose stop, which is shown as a hollow cylinder $10^a$, standing upon its end on a plane surface of the base and of such a height that a parallel portion of the frame at $10^b$ will contact with it when said frame is in a horizontal position. This cylinder constitutes a stop for limiting the downward movement of the frame, while a screw $10^c$, threaded through the frame at $10^d$, with its lower end extending through the cylinder and adapted to bear upon the base-plate, serves to raise the frame from this lower limiting position. A spring $10^e$, secured to the base and put under tension by the pressure of the frame upon it, serves to counterbalance in a measure the weight of said frame and supported pantograph system.

Upon the base in proximity to the joint between the members 19 19' is provided means for fastening a pattern-support, such means as here indicated consisting of abutments 44 44 upon the base with springs 44', adapted to be drawn downward by screws 44" and a threaded lug 45, through which turns a set-screw 45'. As illustrated in the drawings, this screw holds in place against the abutments a pattern-support comprising a plate 46, bearing upon its upper surface short columns or projections 47 of a suitable shape to support a pattern 48, which may be soldered or otherwise secured thereon. At the opposite end of the base near the connection between the members 18 18', and preferably within the vertical plane of the same, is mounted a holder or chuck for the piece upon which the work is to be done, consisting of a plate 49, secured to the base and from which there extends an abutment 50 and a lug 51. Against an angle of the former the piece of metal upon which the work is to be done may rest, being held in place by a set-screw 52, threaded through the lug.

Secured to one of the bars 19 19' near their juncture where they move over the pattern-support is a pattern follower or tracer, (designated as a whole by E,) which may consist of a body 53, fixed to the lower arm 35' and bent up over the other arm, where it is provided with a handle 54. The lower portion has a vertical threaded opening to receive a screw 55 upon a head 56, provided with a pattern-following surface, preferably of conical shape and having its axis lying in the axis of the pivotal connection between the members. The screw is preferably slit at 55' to enable the fit to be sufficiently tight to prevent its turning from the contact of the conical surface with the pattern; but it may be screwed in and out by a knurled surface about its upper edge, and this movement varies the relation of the tracer to the pattern when the system is in a horizontal position.

Figure 1:
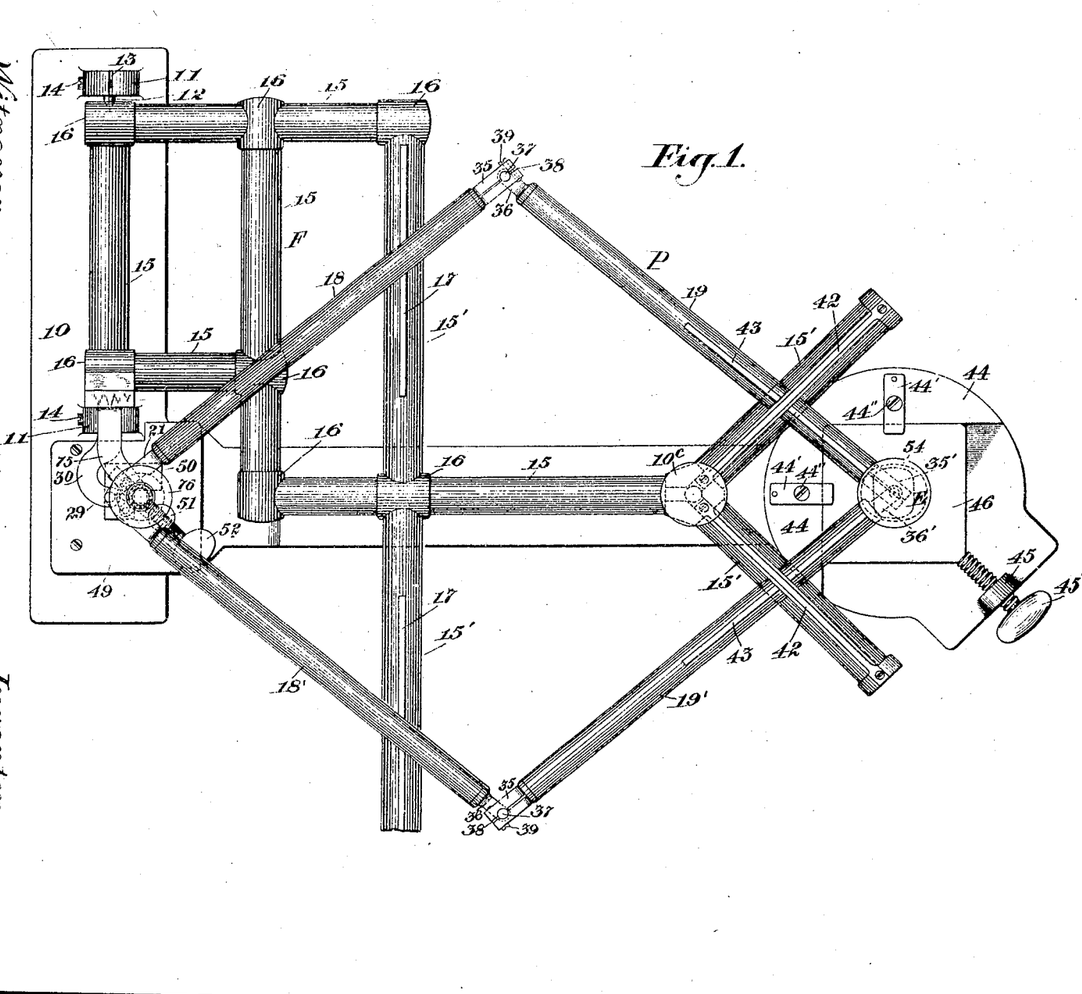
Figure 1 is a top plan view of a machine made according to the present invention.
Figure 2:
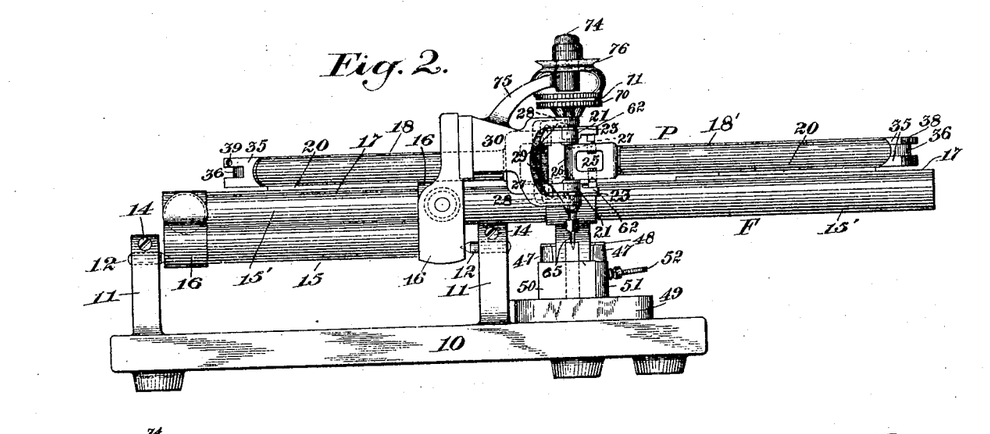
Fig. 2 is an end elevation thereof looking from the left in Fig. 1.
Figure 3:
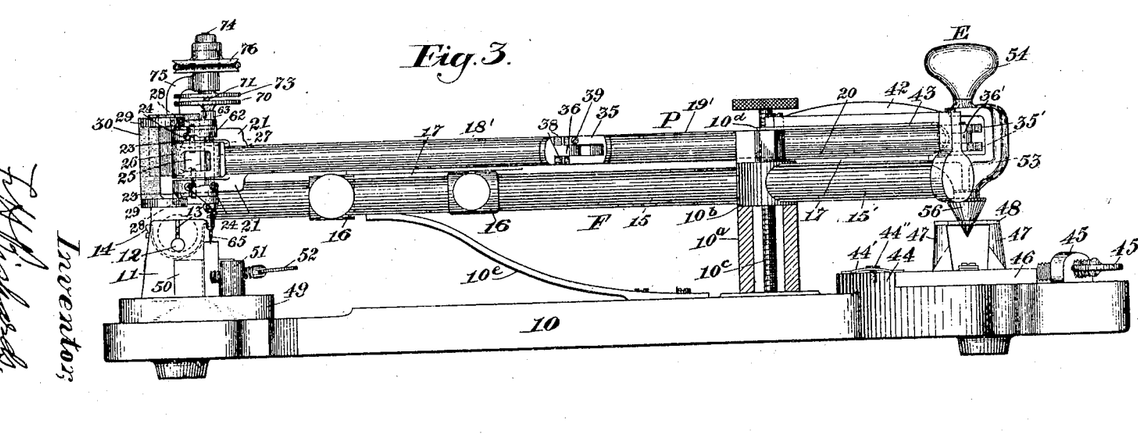
Fig. 3 is a side elevation, parts being in section.
Figure 4:
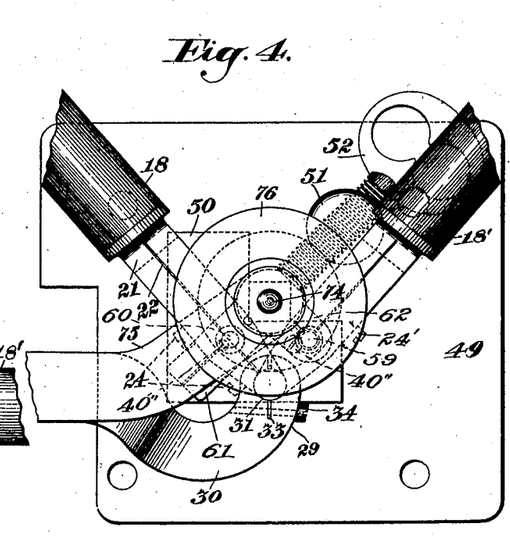
Fig. 4 is an enlarged plan view of that portion of the machine carrying the cutting-tool.
Figure 5:
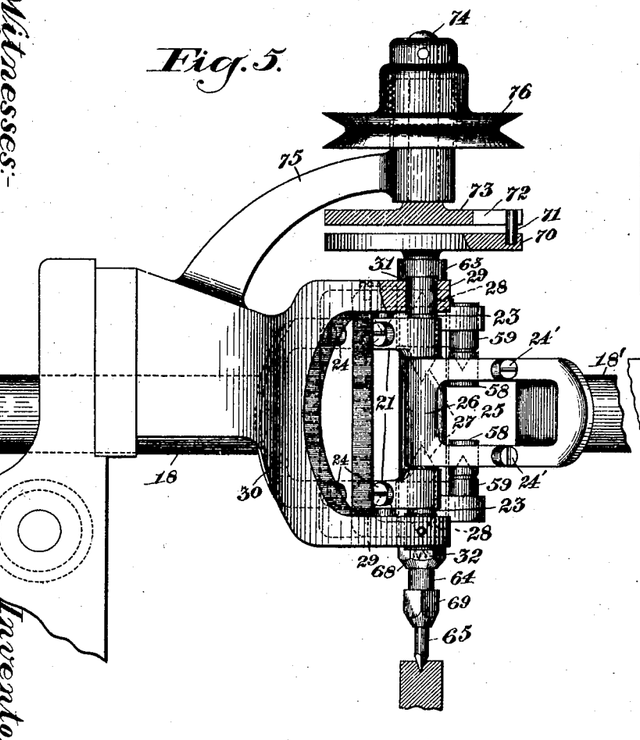
Fig. 5 is an end elevation of the same.
Figure 6:
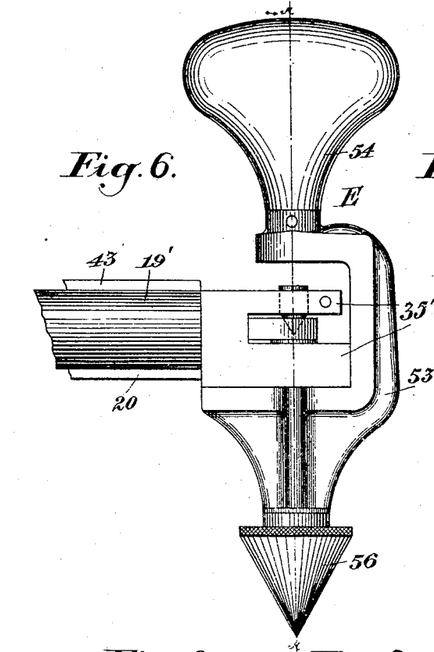
Fig. 6 is an enlarged side elevation of the pattern follower or tracer.
Figure 7:
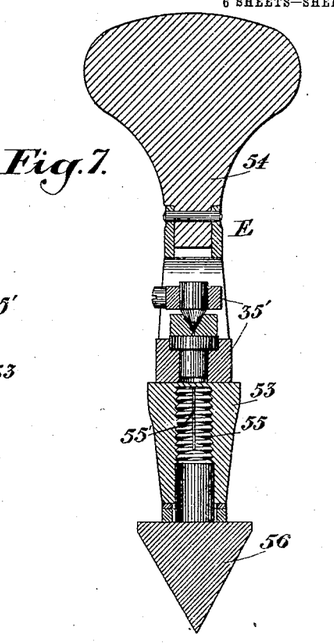
Fig. 7 is a vertical section on the line *a a* of Fig. 6.
Figure 8:
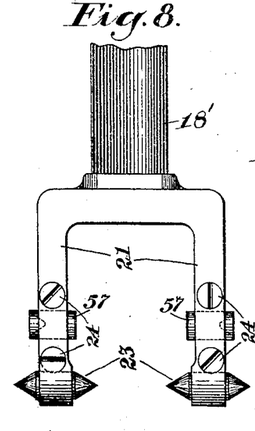
Figs. 8 and 9 are respectively a side elevation and a plan view of the connecting ends of one of the pantograph members adjacent to the cutting-tool.
Figure 9:
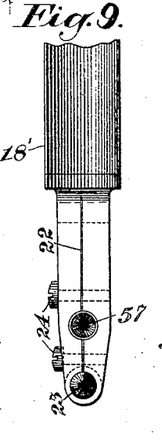
Figure 10:
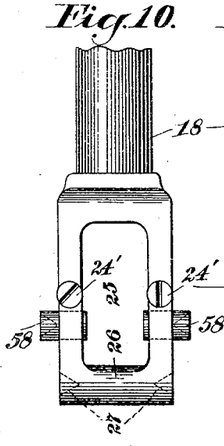
Figs. 10 and 11 are similar views of the coacting member.
Figure 11:
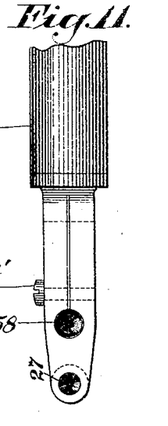

In the illustrated organization the tool for operating upon the work is mounted upon the pantographic system as follows: In openings located in the arms 21 21 of the bifurcated end of a member 18' and nearer the base of such arms than the pins 23, already referred to, (see Fig. 8,) are cups 57, having at their outer ends depressions with inclined walls, and in similar openings in the sides of the corresponding end portion of the other member 18 and located farther from the extreme end of the member than the pivot-recesses 27 (see Fig. 10) are like cups 58. The former cups may be retained in position by the same clamping device as secures the pins 23, while the latter cups may be held by a like arrangement of slit wall and set-screw 24'. The depressions in the cups 57 57 receive suitably-shaped points upon pairs of pivot-pins 60 60, while the depressions in the cups 58 58 receive suitably-shaped points upon pairs of pivot-pins 59 59. The two pairs of oppositely-disposed pins 60 60 and 59 59 are mounted, respectively, in arms 61 and 62 62, which constitute the cell or section of the main pantograph system. They are here clamped in openings in such members with an intersecting slit and a set-screw 24'', while, as illustrated, the upper pins may have adjusting-screws 40'', similar to 40', previously described. The member 61 is formed in a single piece, its horizontal arms being connected by a vertical portion, while the member 62 62 consists of two separate arms. The arms of both members have openings through which extends a vertical sleeve 63, the arms of the member 62 62 being clamped upon it by the set-screws 24'' and the other turning loosely about it retained against longitudinal movement by the aforesaid clamped member. Within the sleeve is journaled a driving-shaft 64 for a cutting-tool 65. In the illustrated construction the shaft is provided with a conical portion 66, which fits a similarly-shaped bearing inside of the sleeve, and an annular enlargement or ring 67 at the end of the conical portion abutting against the end of the sleeve. By the adjustment of a nut 68, having an annular flange projecting under the ring and holding it and the cone in the bearing in the sleeve, the wear may be taken up. A split clutch 69 upon the lower end of the shaft serves to hold a cutting-tool. It will be apparent that while a tendency to spring the arms 21 21 apart might be created by reason of an undue pressure of the pins 23 23 against their respective sockets 27 27 the inward pressure or compressive action of the pivot-pins 60 60 operate to neutralize this tendency.

To impart rotation to the tool, the shaft 64 may be provided at its upper end with a disk or plate 70, carrying an upwardly-projecting pin 71. This extends into a slot 72 in an oppositely-placed disk or plate 73 on the lower end of a short shaft 74, journaled in an arm 75 of the bracket 30. The shaft 74 is provided with a suitable pulley 76, which may be rotated by a belt from any suitable source of power. The shiftable connection between the shaft 74 and the shaft 64 permits the latter to move with its pivoted supports without changing the position of the former or the tension of the driving-belt.

It will be seen that the members 18 18 19 being of equal length and 61 and 62 62 equal to each other and pivoted to the longer members at points equally distant from their adjacent juncture they form a pantograph system. The first four members constitute a large parallelogram with the tracer carried at one angle, and the last two members in connection with equal lengths of the members 18 18 a smaller parallelogram with the tool having the same relation with respect to the similar angle thereof. A copy of the object about which the tracer is moved may therefore be produced, being reduced in size to an extent dependent upon the ratio of the long and short members. At the same time the fact that the entire system is capable of vertical movement about an axis adjacent to the cutting-tool gives said tool a like reduced vertical movement, and as the tracer is moved up and down the edges of the pattern the inclined surface of the tracer permits a smooth uniform movement in different planes, which tracing movement will be reproduced to a reduced extent, as aforesaid, by a similarly-inclined cutting-face of the tool, the point of which preferably forms an angle equal to the point of the follower.

At the commencement of the operation, the pattern being in place upon its support and the piece of metal from which the object is to be made, as a die or punch, clamped in place, the tracer is turned outward by its screw until the upper end or largest portion of the conical surface will contact with the pattern. This holds the cutter at some distance from the plane of the finished surface of the work and will enable the operator as he moves the tracer about the pattern to take a preliminary or roughing cut. Then by screwing in the tracer a certain distance the tool may be made to take a position somewhat nearer the plane of finish and another cut taken, this continuing at desired intervals until the tracer has been brought up into contact with its support, when the finishing cut may be taken. When the work is being done in an opening inclosed by metal, as in the center of the letter "O," for example, the supporting-frame may be raised by the screw 10° until the point of the tool is above the work, and then it can be fed gradually downward into the metal and successive cuts taken until the finish cut is reached at the time when the supporting-frame rests upon stop 10ª.

Having described my invention, I claim—

1. The combination with a pivotally-mounted articulated pantograph system comprising a large and a small cell, of a supporting-frame in contact with a member of which each member of the large cell is adapted to slide, and which frame is adapted to oscillate about an axis transverse to the pivotal axis of the system; and a tool and a tracer carried by the system.

2. The combination with a pantograph system comprising a large and a small cell and which is pivotally mounted to swing about a vertical axis, of a supporting-frame in contact with a member of which each member of the large cell is adapted to slide, and which frame is adapted to oscillate about a horizontal axis; a tool carried by one cell of the system; and a tracer carried by the other cell.

3. The combination with a pantograph system comprising a large and a small cell, and which is pivotally mounted to swing about a vertical axis, of a supporting-frame in contact with a member of which each member of the large cell is adapted to slide, and which frame is adapted to oscillate about a horizontal axis; a rotative tool carried by one cell of the system; and a tracer carried by the other cell.

4. The combination with a pantograph system comprising a large and a small cell and which is pivotally mounted to swing about a vertical axis, of a supporting-frame in contact with a member of which each member of the large cell is adapted to slide, and which frame is adapted to oscillate about a horizontal axis; a rotative tool carried by one cell of the system; and a tracer carried by the other cell and having a conical operative surface.

5. The combination with a pantograph system comprising a large and a small cell and which is pivotally mounted to swing about a vertical axis, of a supporting-frame in contact with a member of which each member of the large cell is adapted to slide, and which frame is adapted to oscillate about a horizontal axis; a rotative tool carried by one cell of the system; a tracer mounted on the other cell and adjustable toward and away from the plane of the system and having a conical operative surface.

6. The combination with a support for the members of a pantograph system and which support is oscillatory about an axis disposed substantially parallel to the plane of the system, of a pantograph system slidably mounted thereon and pivotally connected therewith; a tool and a tracer carried by the system; and retaining-bars secured to said support and between which and the support the pantograph system is adapted to slide.

7. The combination with an oscillatory frame, of a pantograph system pivotally mounted thereon and having a pivotal axis between two of its jointed members coincident with the pivotal axis of its connection with said frame.

8. The combination with an oscillatory supporting-frame having a pair of projecting arms, of a pantograph system comprising a member having a bifurcated end located between the said projecting arms and a member projecting into the space between the limbs of said bifurcation; and a pair of pivot-pins secured to said limbs and each engaging at one end with an arm of the supporting-frame and at the other end with the end portion of the second-mentioned member of the pantograph system.

9. The combination with an oscillatory supporting-frame having a pair of projecting arms provided with cylindrical bearing parts adjustably secured to the arms, of a pantograph system comprising a member having a bifurcated end located between the said projecting arms and a member projecting into the space between the limbs of said bifurcation; and a pair of cylindrical pivot-pins adjustably secured to said limbs, the outer ends of said pins being conical and entering sockets in the said bearing parts of said arms and the inner ends of said pins being likewise conical and entering sockets in the end portion of the second-mentioned member of the system.

10. An articulated pantograph system comprising pairs of jointed members, one of which members is bifurcated and the other of which enters the space between the limbs of such bifurcation; and a pair of cylindrical pivot-pins adjustably clamped in cylindrical openings in the limbs of the bifurcation and having conical ends entering sockets in the end portion of the member entering the bifurcation.

11. The combination of an oscillatory frame, an articulated pantograph system pivotally mounted thereon and comprising pairs of jointed members, one of which members is bifurcated and the other of which enters the space between the limbs of such bifurcation; a pair of cylindrical pivot-pins adjustably clamped in cylindrical openings in the limbs of the bifurcation and having conical ends entering sockets in the end portion of the member entering the bifurcation; a tool carried by said system adjacent to its point of pivotal connection with the frame; a driving-pulley mounted on the frame; and an adjustable driving connection between the pulley and the tool.

12. The combination of an oscillatory frame, an articulated pantograph system pivotally mounted thereon and comprising pairs of jointed members one of which members is bifurcated and the other of which enters the space between the limbs of such bifurcation; a pair of cylindrical pivot-pins adjustably clamped in cylindrical openings in the limbs of the bifurcation and having conical ends entering sockets in the end portion of the member entering the bifurcation; a tool carried by said system adjacent to its point of pivotal connection with the frame; a driving-pulley mounted on the frame; and a pin-and-slot driving connection between the pulley and the tool.

13. The combination with a movably-mounted articulated pantograph system embodying a large and a small cell, of a supporting-frame coöperating with a member of which each member of the large cell is adapted to slide, and which frame is adapted to move about an axis transverse to a pivotal axis of the system, and a tool and tracer carried by the system.

14. The combination with a pantograph system comprising a large and small cell and which is movably mounted to swing about a vertical axis, of a supporting-frame coacting with a member of which each member of the large cell is adapted to slide, and which frame is adapted to move about a horizontal axis, a work-performing member carried by one cell of the system, and a guide for said work-performing member carried by the other cell.

15. The combination with a pantograph system comprising a large and a small cell, and which is suitably mounted to be carried about a vertical axis, of a supporting-frame coöperating with a member of which each member of the large cell is adapted to move, and which frame is adapted to turn about a horizontal axis; a rotative work-performing member carried by one cell of the system, and a guide for said work-performing member carried by the other cell.

16. The combination with a pantograph system comprising a pair of cells and which is mounted to swing about an axis, of a supporting-frame coacting with a member of which each member of one of the cells is adapted to slide, and which frame is adapted to move about another axis; a rotative work-performing member carried by one cell of the system, and a guide for said work-performing member carried by the other cell and having a suitable operative surface.

17. The combination with a pantograph system comprising a large and a small cell and which swings about a vertical axis, of a supporting-frame in contact with the members of which the members of the large cell are adapted to slide, and which frame is adapted to move in a horizontal axis; a rotative work-performing member carried by one cell of the system; a guide for said work-performing member mounted on the other cell and adjustable toward and away from the plane of the system and having a conical operative surface.

18. The combination with a support for the members of a pantograph system and which support is movable about an axis disposed substantially parallel to the plane of the system, of a pantograph system movably mounted thereon and movably connected therewith; a work-performing member, and means for guiding said work-performing member carried by said system; and retaining-bars secured to said support and between which and the support the pantograph system is adapted to move.

19. The combination with a movable frame, of a pantograph system pivotally mounted thereon and having an axis of movement between two of its jointed members coincident with the axis of its connection with said frame.

20. The combination with a movably-mounted supporting-frame having a pair of projecting arms, of a pantograph system comprising a member having a bifurcated end located between the said projected arms, a member projecting into the space between the limbs of said bifurcation, and a pair of members secured to said limbs and each engaging at one end with the arm of a supporting-frame, and at the other end with the end portion of the second portion of the pantograph system.

21. The combination with a mounted articulated pantograph system comprising a large and a small cell, of a supporting-frame in contact with a member of which each member of the large cell is adapted to slide, and which frame is adapted to move about an axis transverse to the axis of the system, and a tool and tracer carried by the system.

FRANCIS H. RICHARDS.

Witnesses:
 FRED. J. DOLE,
 C. E. VOSS.